(12) United States Patent
Oyama

(10) Patent No.: US 10,168,829 B2
(45) Date of Patent: Jan. 1, 2019

(54) INFORMATION PROCESSING APPARATUS, CONTROL METHOD THEREFOR, PROGRAM, AND RECORDING MEDIUM

(75) Inventor: Yasufumi Oyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/390,870

(22) PCT Filed: Jul. 13, 2010

(86) PCT No.: PCT/JP2010/004534
§ 371 (c)(1),
(2), (4) Date: Feb. 16, 2012

(87) PCT Pub. No.: WO2011/021344
PCT Pub. Date: Feb. 24, 2011

(65) Prior Publication Data
US 2012/0146929 A1 Jun. 14, 2012

(30) Foreign Application Priority Data
Aug. 18, 2009 (JP) .................. 2009-189330

(51) Int. Cl.
G06F 3/041 (2006.01)
G06F 3/0488 (2013.01)
(Continued)

(52) U.S. Cl.
CPC ............ G06F 3/0418 (2013.01); G06F 3/041 (2013.01); G06F 3/0412 (2013.01); G06F 3/0416 (2013.01); G06F 3/0488 (2013.01); H04N 1/0044 (2013.01); H04N 1/0048 (2013.01); H04N 1/00411 (2013.01); H04N 1/00482 (2013.01); H04N 5/23216 (2013.01);
(Continued)

(58) Field of Classification Search
CPC ............................................ G06F 2203/04104
USPC ....................................... 178/18.05; 345/173
See application file for complete search history.

(56) References Cited

U.S. PATENT DOCUMENTS 4,914,624 A * 4/1990 Dunthorn ...................... 345/173
5,594,471 A 1/1997 Deeran et al.
(Continued)

FOREIGN PATENT DOCUMENTS

CN 1614545 A 5/2005
CN 101187822 A 5/2008
(Continued)

Primary Examiner — Towfiq Elahi
(74) Attorney, Agent, or Firm — Canon U.S.A., Inc. I.P. Division

(57) ABSTRACT

An information processing apparatus includes a touching detection unit configured to detect a touching operation and a touch-up operation for the display unit, a time counting unit configured to count a time period of continuous touching on a specific area of the display unit, and a control unit configured, when a touch-up operation from the specific area is detected and a counted time period of continuous touching has not reached a predetermined time period, to execute a function assigned to the specific area while when the touch-up operation from the specific area is detected and the counted time period of continuous touching has reached the predetermined time period, not to execute the function assigned to the specific area in relation only to the detected touch-up operation.

16 Claims, 9 Drawing Sheets

(51) Int. Cl.
*H04N 5/232* (2006.01)
*H04N 1/00* (2006.01)
*H04N 101/00* (2006.01)

(52) U.S. Cl.
CPC . *H04N 5/23293* (2013.01); *G06F 2200/1614* (2013.01); *H04N 1/0035* (2013.01); *H04N 2101/00* (2013.01); *H04N 2201/0084* (2013.01)

(56) References Cited

U.S. PATENT DOCUMENTS

| | | | |
|---|---|---|---|
| 6,266,050 B1 | 7/2001 | Oh et al. | |
| 7,956,845 B2* | 6/2011 | Lee | 345/173 |
| 2002/0056575 A1 | 5/2002 | Keely et al. | |
| 2003/0206199 A1* | 11/2003 | Pusa et al. | 345/794 |
| 2005/0099400 A1* | 5/2005 | Lee | 345/173 |
| 2006/0238517 A1 | 10/2006 | King et al. | |
| 2006/0256091 A1* | 11/2006 | Hino | 345/173 |
| 2006/0284850 A1 | 12/2006 | Tokkonen | |
| 2007/0262951 A1 | 11/2007 | Huie et al. | |
| 2007/0277125 A1 | 11/2007 | Shin | |
| 2008/0174570 A1* | 7/2008 | Jobs et al. | 345/173 |
| 2008/0180408 A1* | 7/2008 | Forstall et al. | 345/177 |
| 2008/0184139 A1 | 7/2008 | Stewart et al. | |
| 2008/0239132 A1* | 10/2008 | Kohama | G06F 3/0481 348/333.01 |
| 2009/0002540 A1* | 1/2009 | Suzuki | H04N 5/23293 348/333.05 |
| 2009/0154910 A1* | 6/2009 | Weinberg et al. | 396/50 |
| 2009/0184935 A1 | 7/2009 | Kim | |
| 2010/0235732 A1* | 9/2010 | Bergman | G06F 3/0488 715/702 |

FOREIGN PATENT DOCUMENTS

| | | |
|---|---|---|
| CN | 101339450 A | 1/2009 |
| EP | 2068236 A1 | 6/2009 |
| JP | 05-298027 A | 11/1993 |
| JP | 11-327788 A | 11/1999 |
| JP | 2003-280812 A | 10/2003 |
| JP | 2006-268313 A | 10/2006 |
| JP | 2006-318393 A | 11/2006 |
| JP | 2008-59030 A | 3/2008 |
| JP | 2009-009424 A | 1/2009 |
| JP | 2009-129251 A | 6/2009 |
| WO | 01/59975 A2 | 8/2001 |
| WO | 2007/116977 A1 | 10/2007 |
| WO | 2009001544 A1 | 12/2008 |
| WO | 2009/018314 A2 | 2/2009 |

* cited by examiner

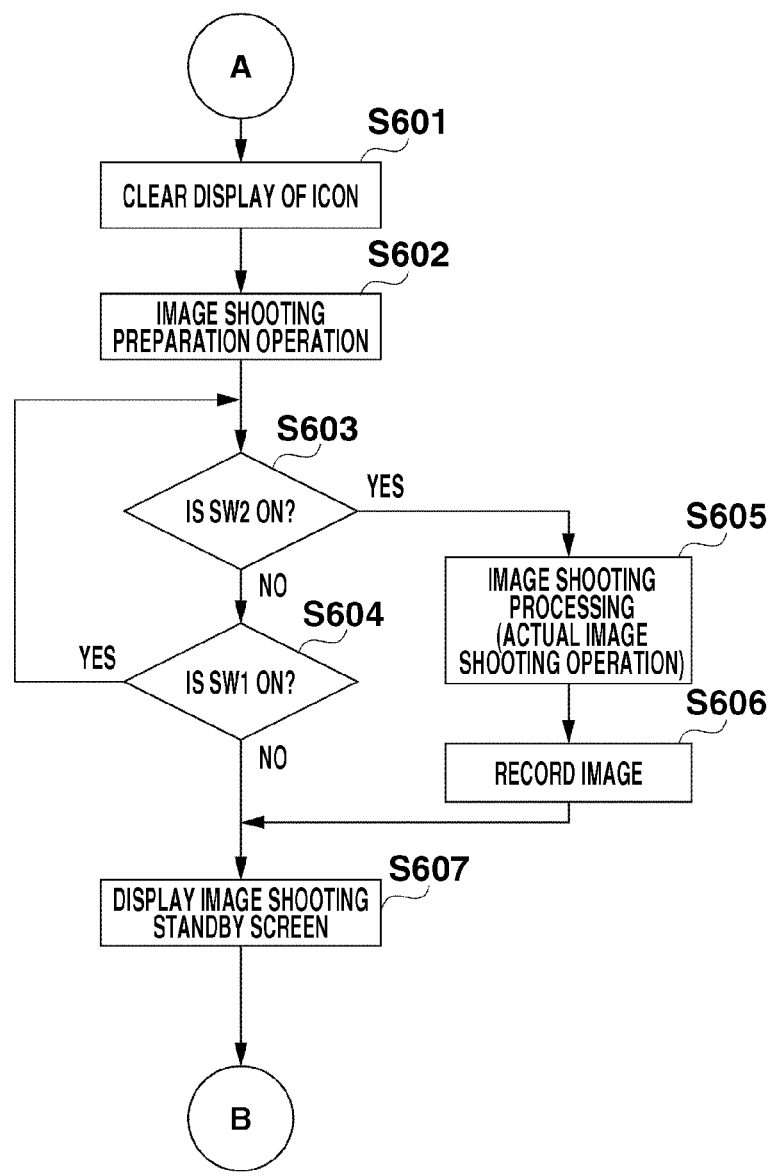

under the user's finger is off the button icon, the user's finger is off the button icon.

INFORMATION PROCESSING APPARATUS, CONTROL METHOD THEREFOR, PROGRAM, AND RECORDING MEDIUM

CROSS REFERENCE TO RELATED APPLICATIONS

This application is a National Stage filing of PCT Application No. PCT/JP2010/004534 filed Jul. 13, 2010, which claims priority from Japanese Patent Application No. 2009-189330 filed Aug. 18, 2009, the disclosures of each of which are hereby incorporated by reference herein in their entirety.

TECHNICAL FIELD

The present invention relates to an information processing apparatus and a control method therefor configured to prevent an operation error on a touch panel.

BACKGROUND ART

In recent years, a digital device has been marketed that includes a display unit having a touch panel and allows a user to intuitively execute an operation. A digital device like this generally allows a user to execute a function assigned to a button icon which is provided on a display screen including a touch panel by executing a "tapping" operation on the button icon.

A "tapping" operation on a button icon refers to an operation which can be executed by only momentarily touching the button icon with a user's finger. Immediately after the user's finger is off the button icon, the user operation is input and a function assigned to the button icon is executed.

A size of a body of a digital device having a touch panel has been recently decreased to achieve an advantage such that the total number of parts of physical operation members can be reduced by providing a touch panel. On the other hand, in order to improve the visibility, the size of the touch panel itself has become large.

If a ratio of an area of a touch panel to the size of the entire body of the device becomes large, then a hand of the user holding the device body may involuntarily touch a surface of the touch panel, which may cause an operation error. Various control methods for preventing an operation error of a touch panel have been discussed as follows.

Japanese Patent Application Laid-Open No. 2009-009424 discusses a method in which a touch panel includes an operation inhibited area. When a user touches the operation inhibited area, the control method disables an operation icon or displays a message indicating that the user has executed a wrong operation. Accordingly, the control method allows the user to recognize his/her operation mistake and prevents a wrong setting or an operation error.

Japanese Patent Application Laid-Open No. 05-298027 discusses a method in which if a user continues touching a touch panel at the same location for a predetermined time period, then it is determined that a sensor element for detecting a touching state of the touched position has been malfunctioning. In this case, the method disables an input executed after that by touching the touch panel at the position.

However, because the method discussed in Japanese Patent Application Laid-Open No. 2009-009424 includes the operation inhibited area, a touching operation member, such as an operable button icon, cannot be provided in the operation inhibited area. More specifically, in this control method, a part of the entire area of a touch panel cannot be effectively utilized. In addition, an arrangement and a layout of touching operation members are restricted.

In the method discussed in Japanese Patent Application Laid-Open No. 05-298027, even when a sensor element corresponding to a position touched by the user is normally functioning, if the user has actually touched the touch panel at the same position for a predetermined time period or longer, then it is determined that the sensor element is malfunctioning and the sensor element is disabled. Further, in this case, a touching operation executed after that is disabled. Accordingly, in this control method, a touching operation member, such as a button icon, cannot be provided at the position. More specifically, similar to the case of the method discussed in Japanese Patent Application Laid-Open No. 2009-009424, a part of the entire area of a touch panel cannot be effectively utilized and the arrangement and layout of touching operation members are restricted.

CITATION LIST

Patent Literature

PTL 1: Japanese Patent Application Laid-Open No. 2009-009424
PTL 2: Japanese Patent Application Laid-Open No. 05-298027

SUMMARY OF INVENTION

The present invention is directed to an information processing apparatus capable of securely suppressing an operation error on a touch panel without restricting a layout of touching operation members of the touch panel.

According to an aspect of the present invention, an information processing apparatus includes a touching detection unit configured to detect a touching operation for touching a display unit and a touch-up operation, which is an operation for discontinuing the touching the display unit, a time counting unit configured to count a time period of continuous touching on a specific area of the display unit, and a control unit configured, when the touching detection unit detects that a touch-up operation on the display unit starting from the specific area in which the touching operation has been detected and if a time period of continuous touching counted by the time counting unit has not reached a predetermined time period, to execute a function assigned to the specific area while when the touching detection unit detects that the touch-up operation on the display unit from the specific area at which the touching operation has been detected and if the time period of continuous touching counted by the time counting unit has reached the predetermined time period, not to execute the function assigned to the specific area in relation only to the detected touch-up operation.

According to an aspect of the present invention, an operation error on a touch panel can be securely suppressed without restricting a layout of touching operation members on the touch panel.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the present invention.

FIG. 4 includes and refers to FIGS. 4A and 4B, where

FIG. 6 is a flow chart illustrating an example of processing executed when a switch 1 (SW1) is operated.

DESCRIPTION OF EMBODIMENTS

Various exemplary embodiments, features, and aspects of the invention will be described in detail below with reference to the drawings.

Figure 1:
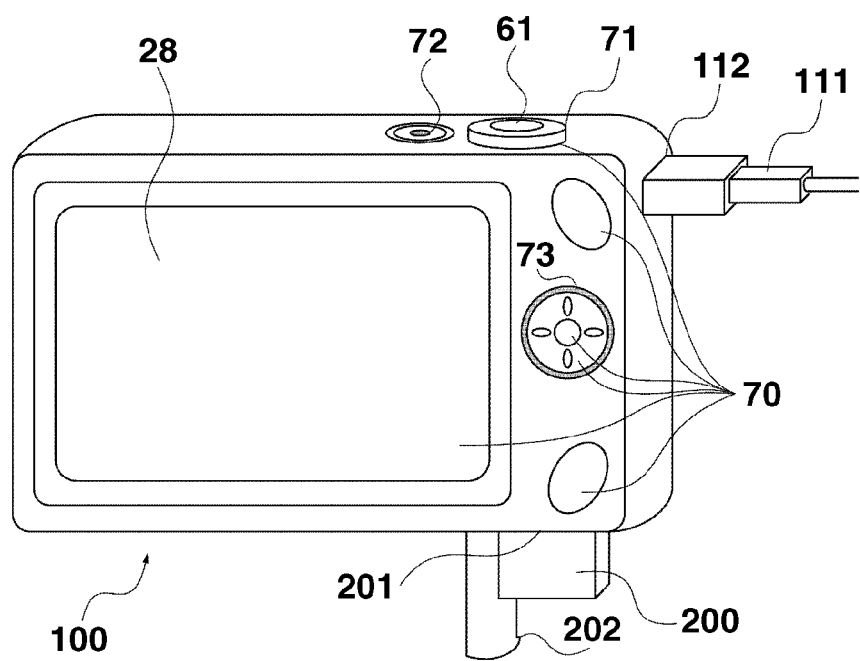
FIG. 1 illustrates an example of an external appearance and an exemplary configuration of a digital camera.

FIG. 1 illustrates an example of an external appearance and an exemplary configuration of a digital camera 100 which is an example of an information processing apparatus according to the present invention.

Referring to FIG. 1, a display unit 28 displays an image and various pieces of information. On a surface of the display unit 28, a touch panel which is an example of an operation unit 70 is provided. With the touch panel, if a user touches the display unit 28, the touching operation by the user can be detected. With this configuration, a touch detection unit according to an exemplary embodiment of the present invention is implemented.

A shutter button (a shutter operation member) 61 is an operation unit for inputting an image shooting instruction. The operation unit 70 includes an operation member for receiving various user operations, such as various switches, buttons, and a panel.

The operation unit 70 includes a controller wheel 73. The controller wheel 73 can be operated by the user by rotating it. In addition, the operation unit 70 includes a zoom operation unit 71. The zoom operation unit 71 is an operation unit for switching to a zooming mode, such as an optical zooming mode or an electronic zooming mode, during the image shooting mode. Further, the zoom operation unit 71 switches the electronic zooming and the number of images to be displayed during an image reproduction mode.

A connector 112 is a connector of the digital camera 100 to a connection cable. A power switch 72 turns on and off power of the digital camera 100. A recording medium 200 is a recording medium, such as a memory card or a hard disk.

A recording medium slot 201 is a slot for storing the recording medium 200. By inserting the recording medium 200 into the recording medium slot 201, data can be transmitted to and from the recording medium 200 and the digital camera 100. A lid 202 is a lid of the recording medium slot 201.

Figure 2:
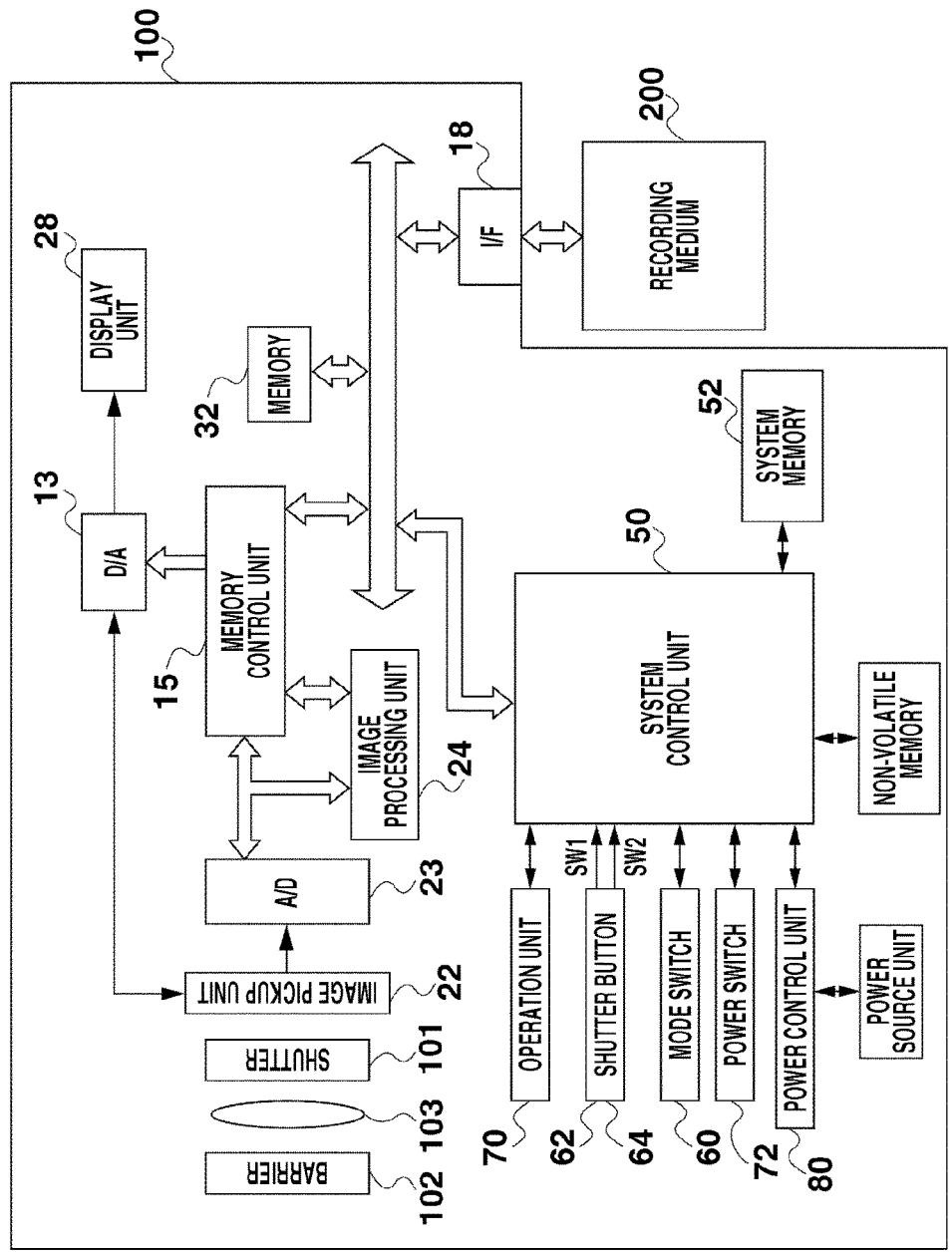
FIG. 2 illustrates an example of a hardware configuration of a digital camera.

FIG. 2 is a block diagram illustrating an exemplary hardware configuration of the digital camera 100 according to a first exemplary embodiment of the present invention.

Referring to FIG. 2, the digital camera 100 includes a photographic lens 103 which includes a focus lens, a shutter 101 including an aperture stop function, and an image pickup unit 22, which includes an image sensor, such as a charge-coupled device (CCD) or a complementary metal oxide semiconductor (CMOS), for converting an optical image into an electrical signal.

An analog-to-digital (A/D) conversion device 23 converts an analog signal into a digital signal. More specifically, the A/D conversion device 23 converts an analog signal output from the image pickup unit 22 into a digital signal. A barrier 102 is provided to cover the image pickup unit 22 including the photographic lens 103. The barrier 102 prevents a smear and a damage of an image pickup system including the photographic lens 103, the shutter 101, and the image pickup unit 22.

An image pickup unit 24 executes various image processing, such as resizing processing, including predetermined pixel interpolation processing, or color conversion processing, on data transmitted from the A/D conversion device 23 or loaded from a memory control unit 15.

In addition, the image pickup unit 24 executes predetermined calculation processing by using photographed image data. Furthermore, a system control circuit 50 executes exposure control and focus control according to a result of the calculation operation by the image pickup unit 24. Accordingly, through-the-lens (TTL) type auto focus (AF) processing, auto exposure (AE) processing, and electronic flash (EF) (pre-flash flashing) processing can be implemented.

Further, the image pickup unit 24 executes predetermined calculation processing by using photographed image data and executes TTL type auto white balance (AWB) processing according to the result of the calculation operation.

Data output from the A/D conversion device 23 is indirectly written on a memory 32 via the image pickup unit 24 and the memory control unit 15 or directly written on the memory 32 via the memory control unit 15.

The memory 32 stores data of an image taken by the image pickup unit 22 and converted by the A/D conversion device 23 into digital data and image data to be displayed on the display unit 28. The memory 32 has a storage capacity large enough to store a predetermined number of still images and a moving image and audio data of a predetermined time length of time. In addition, the memory 32 also functions as an image display memory (video memory).

A digital-to-analog (D/A) conversion device 13 converts image data to be displayed stored on the memory 32 into an analog signal. Further, the D/A conversion device 13 supplies the converted analog signal to the display unit 28. The image data to be displayed written on the memory 32 in the above described manner is then displayed on the display unit 28 via the D/A conversion device 13. The display unit 28 displays the image data on a display device, such as a liquid crystal display (LCD), according to the analog signal from the D/A conversion device 13.

A non-volatile memory 56 is an electrically rewritable and recordable memory. Electrically erasable programmable ROM (EEPROM) is used as the non-volatile memory 56. The non-volatile memory 56 stores a constant and a program used for operating the system control circuit 50. In the present invention, a "program" refers to a program used in executing various processing illustrated in flowcharts described below according to an exemplary embodiment of the present invention.

The system control circuit 50 is a control unit to controls an operation of the entire digital camera 100. By executing the program recorded on the non-volatile memory 56, the system control circuit 50 implements each processing according to the present exemplary embodiment which will be described in detail below.

A system memory 52 includes a random access memory (RAM). The constant and the program used for operating the system control circuit 50, and programs are read from the non-volatile memory 56 on the system memory 52. Further, the system control unit controls the memory 32, the D/A conversion device 13, and the display unit 28 to execute control of display.

A first shutter switch 62, a second shutter switch 64, and an operation unit 70 are an operation member operated by the user to input various operation instructions to the system control circuit 50.

When the shutter switch 62 (hereinafter simply referred to as an "SW1") is half-pressed by the user, namely when an image shooting standby instruction is input by the user by pressing the shutter button 61 of the digital camera 100 halfway, the SW1 becomes ON and a first shutter switch signal is generated. An operation of various processing, such as AF processing, AE processing, AWB processing, or EF processing, starts according to the first shutter switch signal.

When the second shutter switch 64 (hereinafter simply referred to as an "SW2") is fully pressed by the user, namely when an image shooting instruction is input by the user by completely operating the shutter button 61, the SW2 becomes ON and a second shutter switch signal is generated. The system control circuit 50 starts a series of operations of image shooting processing from the reading of a signal output from the image pickup unit 22 to writing image data on the recording medium 200.

A mode shift switch 60 is included in the operation unit 70. The mode shift switch 60 can be operated to give an instruction for shifting the operation mode of the system control circuit 50 to either one of the image shooting mode and the image reproduction mode.

In the present exemplary embodiment, the image shooting mode includes the following plurality of modes, such as an auto image shooting mode, a manual mode, and a scene mode. In the auto image shooting mode, various parameters for the digital camera 100 are automatically determined by a program installed on the digital camera 100 according to a detected exposure value. In the manual mode, the user can freely change various parameters set for the digital camera 100. In the scene mode, a shutter speed, an aperture stop value, a flash emission state, and a sensitivity setting are automatically set in combination. Further, the scene mode includes various modes, such as a portrait mode, a nightscape mode, a landscape mode, a nightscape and snapshot mode, a kids and pet mode, a fresh green and autumn color mode, a party shot mode, a snow mode, a beach mode, a fireworks mode, an aquarium mode, and an underwater mode.

Each operation member of the operation unit 70 is appropriately assigned with a function corresponding to each scene by selecting and operating various functional icons displayed on the display unit 28 and functions as a function button. In the present exemplary embodiment, a function button includes an end button, a return button, an image forward button, a jump button, a search narrow down button, and an attribute change button.

When the user presses a menu button, various menu screens for executing various settings are displayed on the display unit 28. The user can intuitively execute various settings via the menu screen displayed on the display unit 28 with using physical buttons including a four-direction button and a SET button.

The controller wheel 73 is included in the operation unit 70 and can be operated by the user by rotating it. The controller wheel 73 can be operated in combination with each direction button to select a selection item.

More specifically, when the user operates the controller wheel 73 by rotating the same, an electrical pulse signal is generated according to an operation amount. The system control circuit 50 controls each component of the digital camera 100 according to the pulse signal. An angle of rotation operation and the number of revolutions of the controller wheel 73 can be determined according to the pulse signal.

A type of the controller wheel 73 is not limited to a specific type wheel. Any operation member can be used as long as whose rotation operation can be detected by the system control circuit 50. For example, it is also useful if a dial operation member is used as the controller wheel 73 if a pulse signal is generated when the dial operation member is rotated and operated. In addition, it is also useful if a touch wheel which is an operation member including a touch sensor can be used as the controller wheel 73. In this case, it is useful if the controller wheel 73 itself does not rotate and a rotating movement of a finger of the user on the controller wheel 73 is detected.

A power control unit 80 includes a battery cell detection circuit, direct current (DC)-DC converter, and a switch circuit. The switch circuit switches a block to which power is supplied. The power control unit 80 determines whether a battery cell has been mounted, a type of the mounted battery cell, and a remaining amount of the battery.

In addition, the power control unit 80 controls the DC-DC converter according to a result of the above described determination and an instruction from the system control circuit 50. Further, the power control unit 80 supplies necessary power voltage to each unit including the recording medium 200 for a necessary time period.

A power source unit 30 includes a primary battery, such as an alkaline cell and a lithium cell, a secondary battery, such as an NiCd cell, an NiMH cell, or an Li cell, and an alternate current (AC) adapter. An interface 18 is an interface with the recording medium 200, such as a memory card or a hard disk. The recording medium 200 is a recording medium such as a memory card and includes a semiconductor memory or a magnetic disk.

In addition, the operation unit 70 includes a touch panel capable of detecting a touching operation on the display unit 28 by a user. The system control circuit 50 is capable of detecting the following user operation on the touch panel. More specifically, the system control circuit 50 is capable of detecting a user operation for touching the touch panel with his/her finger or a pen (hereinafter an operation of this type is simply referred to as a "touch-down operation"), a user operation for continuing touching on the touch panel with his/her finger or a pen (hereinafter an operation of this type is simply referred to as a "touch-on operation"), a user operation for moving on the touch panel while touching the touch panel with his/her finger (hereinafter an operation of this type is simply referred to as a "move operation"), and a user operation for releasing the touching on the touch panel with his/her finger or a pen (hereinafter an operation of this type is simply referred to as a "touch-up operation") and a user non-operation state in which the user does not touch the touch panel (hereinafter this state is simply referred to as a "touch-off state").

These operations and positional coordinates corresponding to a position at which the user touches the touch panel with his/her finger or a pen is notified to the system control circuit 50 via an internal bus 111. The system control circuit 50 determines what user operation has been executed on the touch panel according to the notified information.

With respect to the moving operation, a direction of moving of the user's finger or the pen moving on the touch panel can be determined in relation to a longitudinal component and a lateral component on the surface of the touch panel according to variation of the positional coordinates. When the user executes a touch-down operation, then a predetermined moving operation, and then a touch-up operation on the touch panel, it is supposed that the user draws a stroke. In the present exemplary embodiment, an operation for quickly drawing a stroke is referred to as a flick operation.

The flick operation is an operation in which the user quickly moves his/her finger by a specific distance on the touch panel while touching thereon, and then releasing his/her finger from the touch panel. In other words, the flick operation is an operation for sweeping the touch panel like filliping.

If a moving operation for a predetermined distance or longer at a predetermined operation speed or higher is detected and then a touch-up operation is detected in this state, then the system control circuit 50 determines that the user has executed a flick operation. On the other hand, if a moving operation for a predetermined distance or longer at a speed lower than the predetermined operation speed is detected, then the system control circuit 50 determines that the user has executed a drag operation.

Now, an exemplary operation executed according to the present exemplary embodiment will be described in detail below with reference to FIGS. 3 through 8.

In the present exemplary embodiment, if a touch-on operation in a button icon area of the touch panel for a predetermined time period is detected, the system control circuit 50 executes control not for enabling (executing) a function of the button icon that the user has touched even when the user executes a touch-up operation after that. The present exemplary embodiment executes the above described control because, if a touch-on operation of the button icon for a predetermined time period or longer is detected, it is determined that the user does not desire to operate the button icon.

Figure 3:
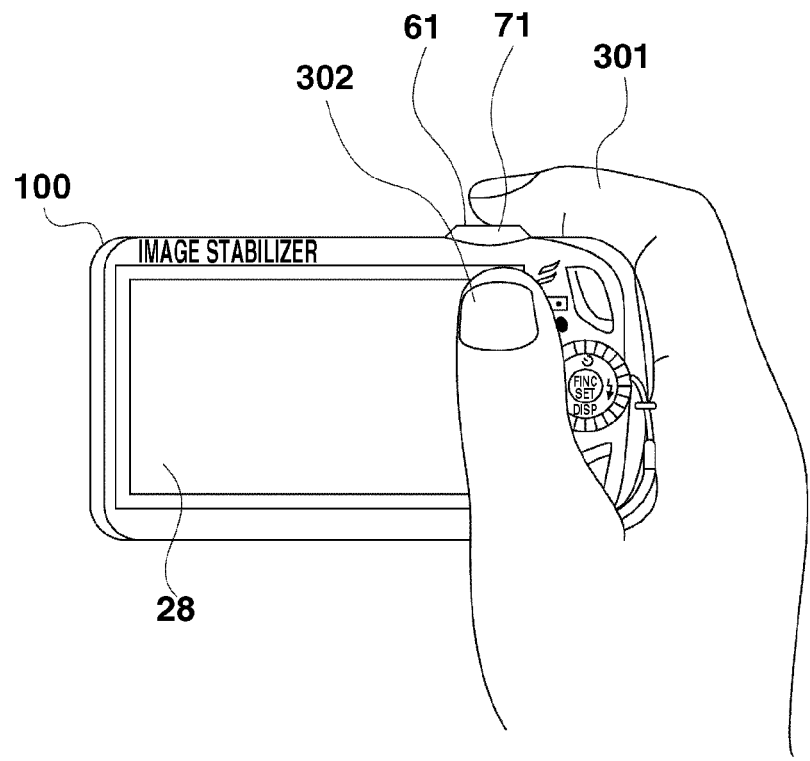
FIG. 3 illustrates an example of a state in which a user holds a digital camera.

FIG. 3 illustrates an example of a state in which the user holds the digital camera 100 with one hand. Referring to FIG. 3, suppose that the user desires to take an image in the image shooting mode. In most cases like this the user, in order to operate the shutter button 61 or the zoom operation unit 71 with an index finger 301 of a right hand (a dominant hand) of the user, holds the digital camera 100 in a state illustrated in FIG. 3, in which the right hand index finger 301 is touching a portion close to the shutter button 61 or the zoom operation unit 71. In this case, a right hand thumb 302 may naturally touch the display unit 28 which is the touch panel although the user does not intentionally touch the display unit 28 to operate the touch panel. In this state, if a button icon is provided at a position at which the user unintentionally touches the touch panel with the right hand thumb 302, then the function of the button icon may be executed when the user releases the right hand thumb 302 from the digital camera 100 even if the user does not intend to operate the button icon. In other words, an operation error described above may occur in this case.

In the present exemplary embodiment, if a touch-on operation for a predetermined time period or longer at the position at which the button icon is provided is detected, then it is determined that the user has merely held the digital camera 100 with unintentionally touching the touch panel as illustrated in FIG. 3. Further, in this case, the present exemplary embodiment does not execute the function of the button icon even if the user executes a touch-up operation after that.

Figure 4A:
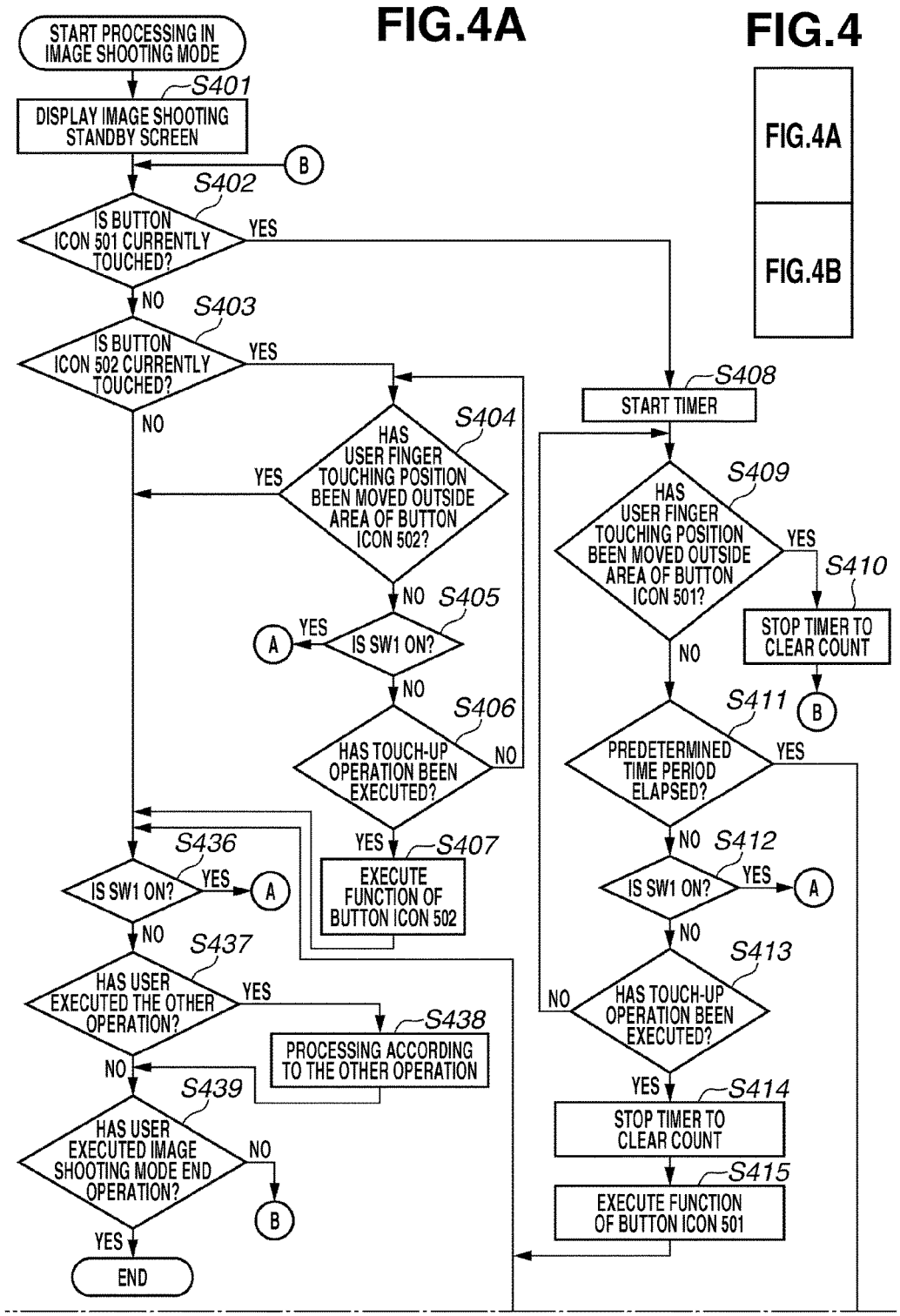
FIG. 4A is a former part of a flow chart illustrating an example of processing executed during an image shooting mode.
Figure 4B:
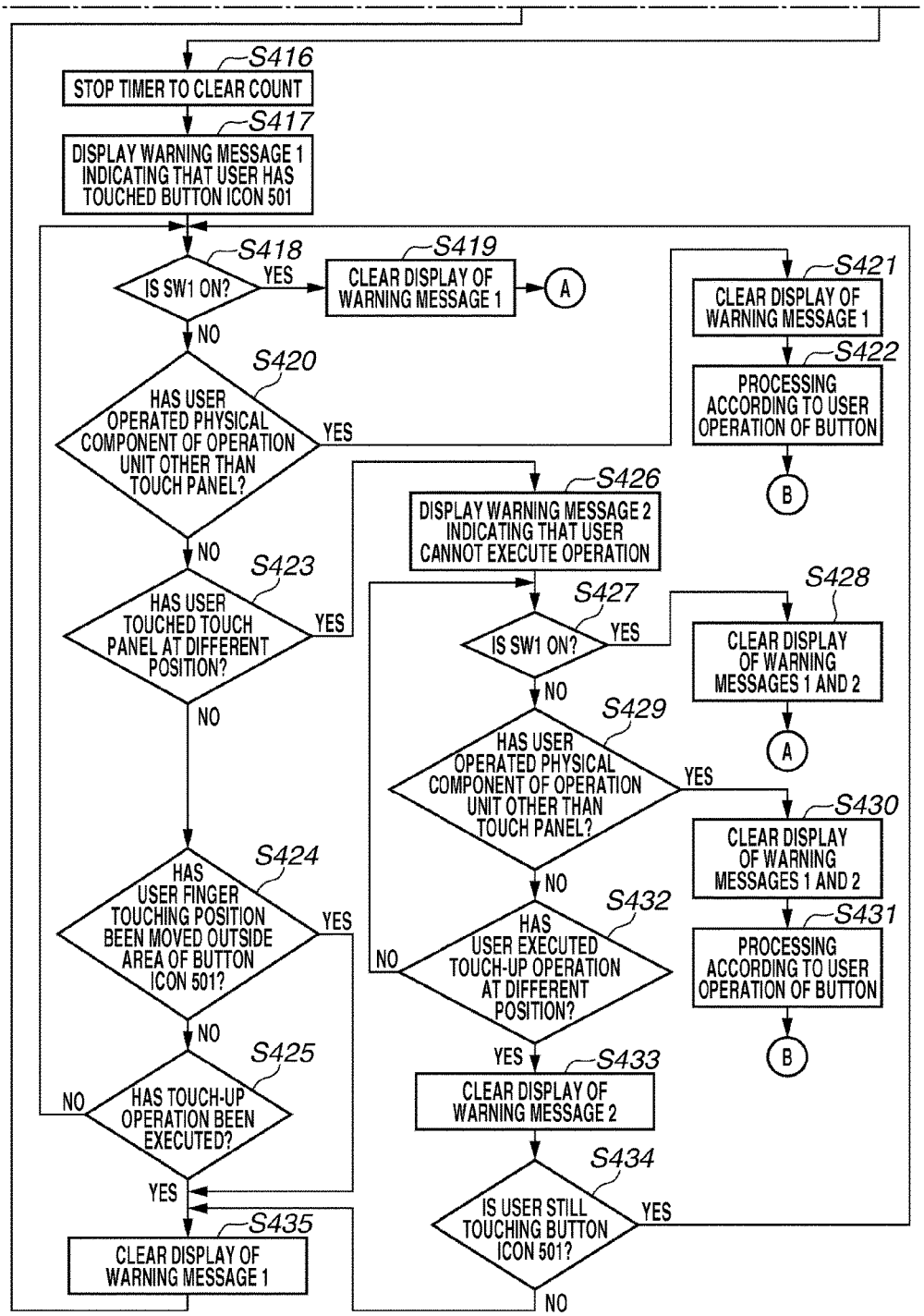
FIG. 4B is a latter part of a flow chart illustrating an example of processing executed during an image shooting mode.

FIG. 4, which includes and refers to FIGS. 4A and 4B, is a flow chart illustrating an example of processing executed by the system control circuit 50 in the image shooting mode. Each processing according to the flow chart in FIGS. 4A and 4B is implemented by the system control circuit 50 by loading a program from the non-volatile memory 56 on the system memory 52 and executing it.

When the digital camera 100 is activated in the image shooting mode or when the digital camera 100 is activated in another operation mode, such as the image reproduction mode, and shifted to the image shooting mode by the user operation of the mode shift switch 60 of the operation unit 70, the processing illustrated in FIGS. 4A and 4B starts.

Figure 5:
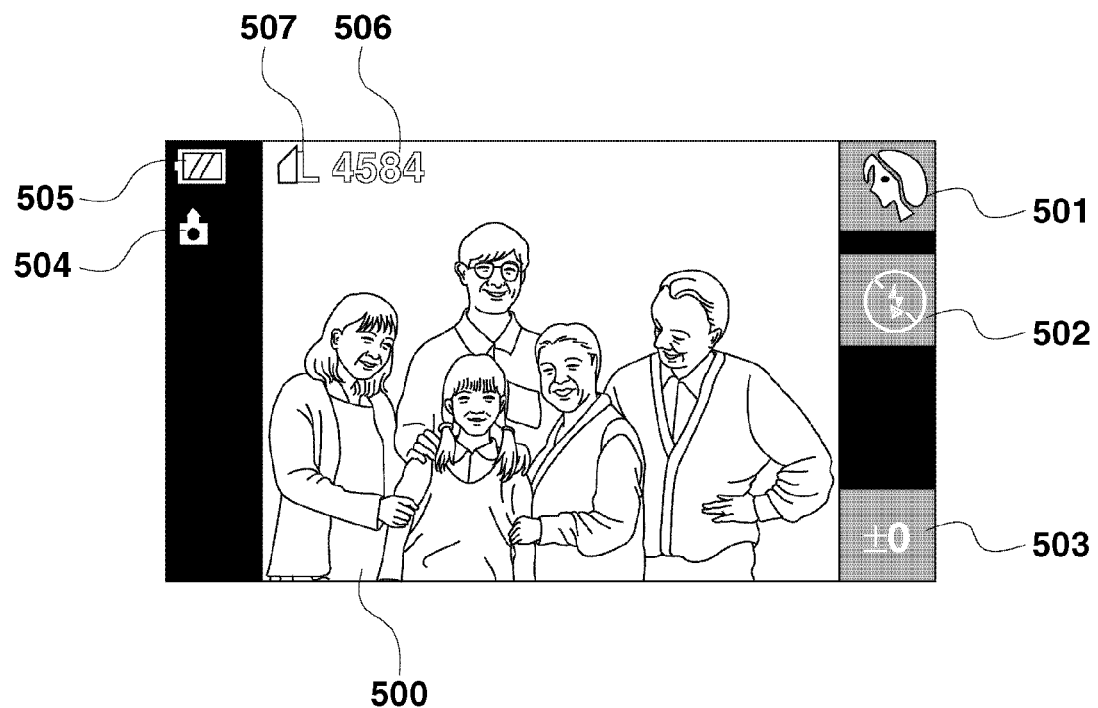
FIG. 5 illustrates an example of an image shooting standby mode screen displayed on a display unit.

Referring to FIG. 4A, in step S401, the system control circuit 50 displays an image shooting standby screen. FIG. 5 illustrates an example of an image shooting standby screen displayed on the display unit 28. Referring to FIG. 5, the display unit 28 displays a through-the-lens image 500, which is an image taken real time by the image pickup unit 22. Each of button icons 501 through 503 is a button icon whose function is executed when the user taps on the corresponding button icon. Each of the button icons 501 through 503 corresponds to the content of a currently setting used in image taking by the digital camera 100.

More specifically, the button icon 501 is a mode switching button. The user can change the setting to a desired image shooting mode which is selected from among a plurality of image shooting modes by tapping on the button icon 501. In the example illustrated in FIG. 5, it is supposed that the user has set the portrait mode (one of the plurality of scene modes), of the plurality of image shooting modes.

The button icon 502 is a flash setting button. The user can change the setting of the flash by tapping on the button icon 502. In the example illustrated in FIG. 5, it is supposed that inhibition of the flash has been currently set.

The button icon 503 is an exposure correction button. The user can correct the exposure by tapping on the button icon 503. In the example illustrated in FIG. 5, the setting "plus or minus 0" has been currently set for the exposure correction.

An icon 504 indicates a current attitude of the digital camera 100. An icon 505 indicates the currently remaining amount of the battery. An icon 506 indicates information about the number of remaining still images recordable on the recording medium 200 according to the current setting. An icon 507 indicates a currently setting of the number of pixels to be recorded and a currently set setting of a compression rate.

Returning to FIG. 4A, after displaying the image shooting standby screen in step S401, the processing advances to step S402. In step S402, the system control circuit 50 determines whether the user has been touching the button icon 501.

When the user executes a touch-down operation with his/her finger at the position of the button icon 501 or when the user has moved his/her finger from a different other position to the position of the button icon 501 in a touch-on state, then the system control circuit 50 determines that the user has been touching the button icon 501. If it is determined that the user has been touching the button icon 501 (Yes in step S402), then the processing advances to step S408. On the other hand, if it is determined that the user is not currently touching the button icon 501 (No in step S402), then the processing advances to step S403.

In step S403, the system control circuit 50 determines whether the user has been touching the button icon 502. In the present exemplary embodiment, if the user executes the touch-down operation at the position of the button icon 502 or if the user moves his/her finger from a different other position to the position of the button icon 502 in the touch-on state, then the system control circuit 50 determines that the user has been touching the button icon 502.

If it is determined that the user has been touching the button icon 502 (Yes in step S403), then the processing advances to step S404. On the other hand, if it is determined that the user is not currently touching the button icon 502 (No in step S403), then the processing advances to step S436.

In step S404, the system control circuit 50 determines whether the position of touching (hereinafter simply referred to as a "touching position") has moved outside the area of the button icon 502. If it is determined that the touching position has moved outside the area of the button icon 502 (Yes in step S404), then the processing advances to step S436. On the other hand, if it is determined that the touching position has not moved outside the area of the button icon 502 (No in step S404), then the processing advances to step S405. In step S405, the system control circuit 50 determines whether the SW1 is ON. If it is determined that the SW1 is ON (Yes in step S405), and then the processing advances to step S601 illustrated in FIG. 6. Processing according to the flow chart in FIG. 6 will be described in detail below.

On the other hand, if it is determined that the SW1 is not ON (No in step S405), then the processing advances to step S406. In step S406, the system control circuit 50 determines whether the user has executed the touch-up operation from the position of the button icon 502. If it is determined that the user has executed the touch-up operation from the position of the button icon 502 (Yes in step S405), then the processing advances to step S407. On the other hand, if it is determined that the user has not executed the touch-up operation from the position of the button icon 502 (No in step S405), then the processing returns to step S404.

In step S407, the system control circuit 50 executes a function assigned to the button icon 502. More specifically, in the example illustrated in FIG. 5, a function for switching the setting of the flash has been assigned. Accordingly, in step S407, the system control circuit 50 executes control for switching the flash setting in this case. After executing the function of the button icon 502, the processing advances to step S436.

In step S408, which is processing executed if it is determined that the user has been touching the button icon 501, the system control circuit 50 starts a timer for counting the time period during which the user continues the touch-on state of the button icon 501.

In step S409, the system control circuit 50 determines whether the touching position has moved outside the area of the button icon 501. If it is determined that the touching position has moved outside an area of the button icon 501 (Yes in step S409), then the processing advances to step S410. In step S410, the system control circuit 50 stops the timer started in step S408 and clears the count of the timer. Then, the processing returns to step S402.

On the other hand, if it is determined that the touching position has not moved outside the area of the button icon 501 (No in step S409), then the processing advances to step S411. In step S411, the system control circuit 50 determines whether the count of the timer started in step S408 has reached a predetermined time period. More specifically, in step S411, the system control circuit 50 determines whether the touching operation of the button icon 501 has continued for the predetermined time period or longer. In other words, the predetermined time period is used for determining whether the user has intended to tap the button icon 501 (to "tap" refers to an operation for executing a touch-up operation immediately after executing a touch-down operation). In the present exemplary embodiment, it is supposed that the predetermined time period is set to 300 msec.

If it is determined that the touching operation of the button icon 501 has continued for the predetermined time period or longer (Yes in step S411), then the processing advances to step S416. On the other hand, if it is determined that the touching operation of the button icon 501 has not reached the predetermined time (No in step S411), then the processing advances to step S412.

In step S412, the system control circuit 50 determines whether the SW1 is ON. If it is determined that the SW1 is ON (Yes in step S412), then the processing advances to step S601 illustrated in FIG. 6. Processing according to the flow chart in FIG. 6 will be described in detail below.

On the other hand, if it is determined that the SW1 is not ON (NO in step S412), then the processing advances to step S413. In step S413, the system control circuit 50 determines whether the user has executed a touch-up operation. The processing in step S413 implements a touch-up operation detection unit according to the present exemplary embodiment. More specifically, if the user has executed the touch-up operation from the position of the button icon 501 within the predetermined time period after the user started touching the button icon 501, then the system control circuit 50 determines that the user has executed the touch-up operation.

If it is determined that the user has executed the touch-up operation (Yes in step S413), then the processing advances to step S414. On the other hand, if it is determined that the user has not executed the touch-up operation (No in step S413), then the processing returns to step S409.

In step S414, the system control circuit 50 stops the timer started in step S408 and clears the count of the timer. In step S415, the system control circuit 50 executes a function assigned to the button icon 501. In the example illustrated in FIG. 5, a function for switching the image shooting mode is assigned to the button icon 501. Accordingly, in this case, the system control circuit 50 executes the function for changing the setting to the desired image shooting mode which is selected from among the plurality of image shooting modes. After executing the function assigned to the button icon 501 in step S415, the processing advances to step S436.

In step S416, the system control circuit 50 stops the timer started in step S408 and clears the count of the timer. In step S417, according to the determination such that the time of continuously touching the button icon 501 has reached the predetermined time period, the system control circuit 50 determines that the user has not intended to execute an operation for tapping the button icon 501 and displays a warning message 1 (a first warning message display).

Figure 7A:
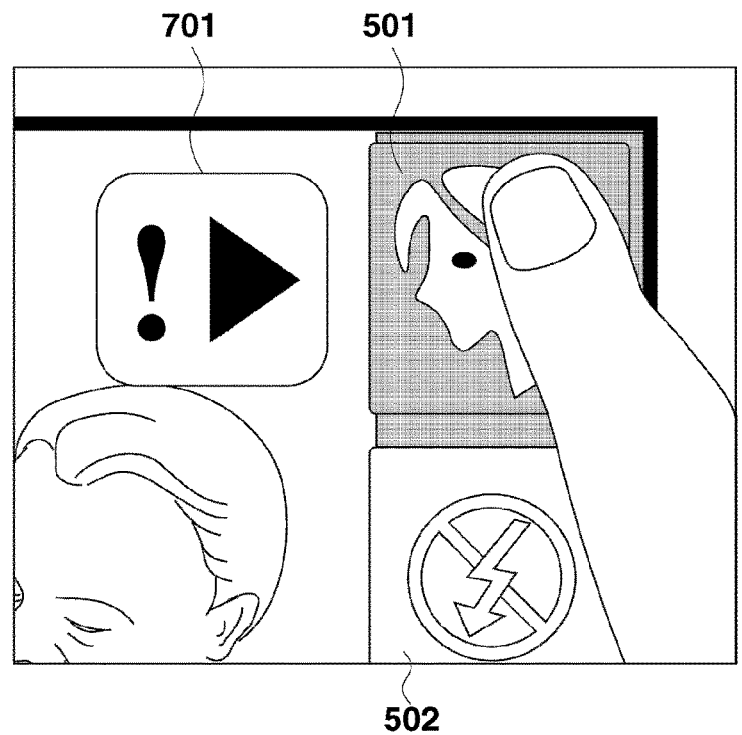
FIG. 7A illustrates an example of a display of a warning message displayed on a display unit.

FIG. 7A illustrates an example of the warning message 1. FIG. 7A illustrates an upper-right corner of the display unit 28 when the digital camera 100, in which the image shooting standby screen illustrated in FIG. 5 is currently displayed, is held in the manner illustrated in FIG. 3. In the example illustrated in FIG. 7A, the thumb of the user is unintentionally touching the button icon 501. Further, it has been determined that the button icon 501 is in a touch-on state for the predetermined time period or longer in step S411 in FIG. 4A. Accordingly, the system control circuit 50 displays a warning message 1 701.

The warning message 1 701 indicates, to the user, that the user has been continuously touching the button icon 501 and that the function of the button icon 501 is not to be executed if the user releases his/her thumb from the button icon 501, as will be described in detail below. By displaying the warning message 1 701 to the user, the present exemplary embodiment can prevent the user from misunderstanding that if the function is not executed when the user has executed the touch-up operation, the touch-up operation is not executed due to a malfunction of the digital camera 100. It is also useful if the display of the button icon 501 is changed to a "button-down" display which indicates that the button icon 501 has been pressed when the touching of the button icon 501 by the user is detected. In this case, the button-down display may be discontinued at a timing of displaying the warning message 1.

In addition, it is also useful if it is determined that the button icon 501 is in the touch-on state for the predetermined time period or longer in step S411, then the system control circuit 50 discontinues the button-down display of the button icon 501 and merely returns the display of the button icon 501 to its original display state without displaying the warning message 1. Further, by merely discontinuing the button-down display of the button icon 501, it can be indicated to the user that the function of the button icon 501 is not to be executed if the user releases his/her finger from the button icon 501 from the above described state.

After executing the processing in step S417 in FIG. 4B, the processing advances to step S418. In step S418, the system control circuit 50 determines whether the SW1 is ON. If it is determined that the SW1 is ON (Yes in step S418), then the processing advances to step S419. In step S419, the system control circuit 50 clears (ends) the display of the warning message 1. Then, the processing advances to step S601 in FIG. 6. Processing according to the flow chart in FIG. 6 will be described in detail below.

On the other hand, if it is determined that the SW1 is not ON (No in step S418), then the processing advances to step S420. In step S420, the system control circuit 50 determines whether the user has executed an operation of the operation member of the operation unit 70 other than the touch panel, such as the physical button. If it is determined that the user has executed an operation of the operation member other than the touch panel (Yes in step S420), then the processing advances to step S421. On the other hand, if it is determined that the user has not executed an operation of the operation member other than the touch panel (No in step S420), then the processing advances to step S423.

In step S421, the system control circuit 50 clears (ends) the display of the warning message 1. In step S422, the system control circuit 50 executes processing corresponding the operation member which is determined to have been operated in step S420. More specifically, if the user operates the operation member other than the touch panel while continuously touching the button icon 501, the operation of the other operation member is prioritized. Accordingly, the warning message 1, which is a warning message related to the button icon 501, is cleared. After executing the processing in step S422, then the processing returns to step S402.

In step S423, the system control circuit 50 determines whether the user has touched the touch panel at another position with another finger while touching the button icon 501. The processing in step S423 implements a multi-point touch determination unit according to the present exemplary embodiment. The determination processing in step S423 will be described in detail below with reference to FIG. 8.

If it is determined that the user has touched the touch panel at a different other position (Yes in step S423), then the processing advances to step S426. On the other hand, if it is determined that the user has not touched the touch panel at the different other position (No in step S423), then the processing advances to step S424.

In step S424, the system control circuit 50 determines whether the touching position has moved outside the area of the button icon 501. If it is determined that the touching position has moved outside the area of the button icon 501 (Yes in step S424), then the processing advances to step S435. On the other hand, if it is determined that the touching position has not moved outside the area of the button icon 501 (No in step S424), then the processing advances to step S425.

In step S425, the system control circuit 50 determines whether the user has executed a touch-up operation. The processing in step S425 implements a touch-up operation determination unit according to the present exemplary embodiment.

If it is determined that the user has executed the touch-up operation (Yes in step S425), then the processing advances to step S435. On the other hand, if it is determined that the user has not executed the touch-up operation (No in step S425), then the processing returns to step S418. The touch-up operation described here is that the user has executed the touch-up operation from the position of the button icon 501 after the touch-on state for the predetermined time period or longer on the button icon 501 is detected. When the system control circuit 50 determines that the user has executed the touch-up operation in this manner, the function assigned to the button icon 501 is not executed. In other words, if the predetermined time period has elapsed while the user has been continuously touching the button icon 501, then the button icon 501 is temporarily disabled. In this case, if the user executes the touch-up operation on the button icon 501, the system control circuit 50 does not execute the function assigned to the button icon 501 (i.e., the switching of the image shooting mode).

Figure 7B:
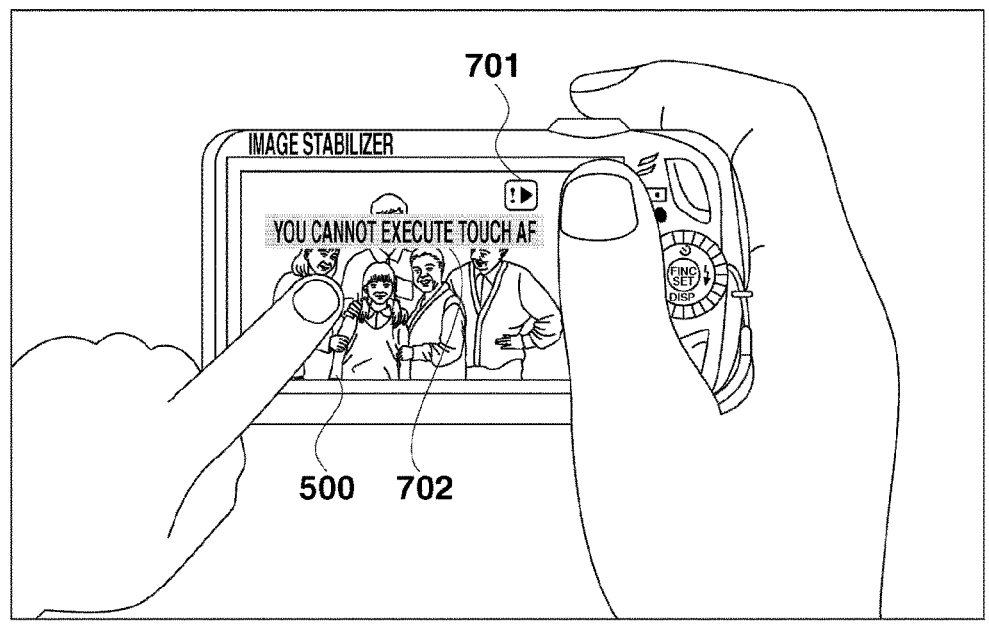
FIG. 7B illustrates an example of a display of a warning message displayed on a display unit.

In step S426, the system control circuit 50 displays a warning message 2 (a second warning message) in addition to the warning message 1. FIG. 7B illustrates an example of a display of the warning message 2. In FIG. 7B, an example of a state is illustrated in which the user holds the digital camera 100, which is currently displaying the image shooting standby screen illustrated in FIG. 5 in the manner described above with reference to FIG. 3. In addition, it is supposed that the user has touched the touch panel at another position with another finger. In this case, the user may intend to execute an operation on the touch panel with the other finger without knowing that he/she has been touching the button icon 501 with the right hand thumb. Further, in this case, because the touching of the button icon 501 has been detected earlier, the system control circuit 50 cannot accept the user operation with the other finger. Accordingly, in this case, the system control circuit 50 displays a warning message 2 702, which indicates that the operation with the other finger cannot be executed.

In the present exemplary embodiment, the touching operation other than the operation via the button icon 501 includes tapping on the button icon 502 or 503 and a "touch AF operation". In the present exemplary embodiment, the "touch AF operation" is an operation corresponding to a function for adjusting a focus to an arbitrary object touched on the screen, selected from the through-the-lens image 500 displayed on the display unit 28. The touch AF operation cannot be executed when the button icon 501 has been touched. Accordingly, in the example illustrated in FIG. 7B, the warning message 2 702 indicates that the touch AF function cannot be executed. In the present exemplary embodiment, it is supposed that the warning message 2 702 is superposedly displayed in a display state in which the warning message 1 701 is superposedly displayed on the image shooting standby screen illustrated in FIG. 5, which is displayed on the display unit 28. More specifically, although not illustrated in FIG. 7B, it is supposed that the icons 504 through 507 and black side margin areas are displayed in this case.

After step S426, the processing advances to step S427. In step S427, the system control circuit 50 determines whether the SW1 is ON. If it is determined that the SW1 is ON (Yes in step S427), then the processing advances to step S428. In step S428, the system control circuit 50 clears (ends) the display of the warning messages 1 and 2. Then, the processing advances to step S601 in FIG. 6. Processing according to the flow chart in FIG. 6 will be described in detail below.

On the other hand, if it is determined that the SW1 is not ON (No in step S427), then the processing advances to step S429. In step S429, the system control circuit 50 determines whether the user has executed an operation of the operation member of the operation unit 70 other than the touch panel, such as the physical button. If it is determined that the user has executed an operation of the operation member other than the touch panel (Yes in step S429), then the processing advances to step S430. On the other hand, if it is determined that the user has not executed an operation of the operation member other than the touch panel (No in step S429), then the processing advances to step S432.

In step S430, the system control circuit 50 clears (ends) the display of the warning messages 1 and 2. In step S431, the system control circuit 50 executes processing corresponding the operation member which is determined to have been operated in step S429. After executing the processing in step S431, the processing returns to step S402.

In step S432, the system control circuit 50 determines whether the user has executed the touch-up operation at a position different from the position which is determined in step S423 that the user has been touching. If it is determined that the touch-up operation at the different other position has not been executed (No in step S432), then the processing returns to step S427. On the other hand, if it is determined that the touch-up operation at the different other position has been executed (Yes in step S432), then the processing advances to step S433.

In step S433, the system control circuit 50 clears the display of the warning message 2 while continuing the display of the warning message 1. In step S434, the system control circuit 50 determines whether the user continuously touching the button icon 501 in the touch-on state. If it is determined that the user continuously touching the button icon 501 in the touch-on state (Yes in step S434), then the processing returns to step S418. On the other hand, if it is determined that the user is not currently touching the button icon 501 (No in step S434), then the processing advances to step S435. More specifically, in the present exemplary embodiment, the system control circuit 50 determines that the user is not currently touching the button icon 501 if the user has moved his/her finger outside the area of the button icon 501 or executed the touch-up operation while touching the touch panel at a different other position with the different other finger. However, in this case, similar to the touch-up operation in step S425, because the touch-on state of the button icon 501 has already continued for the predetermined time period or longer, the button icon 501 is temporarily disabled. Accordingly, the system control circuit 50 does not execute the function of the button icon 501.

In step S435, the system control circuit 50 clears the display of the warning message 1. In step S436, the system control circuit 50 determines whether the SW1 is ON. If it is determined that the SW1 is ON (Yes in step S436), then the processing advances to step S601 (FIG. 6). Processing according to the flow chart in FIG. 6 will be described in detail below. On the other hand, if it is determined that the SW1 is not ON (No in step S436), then the processing advances to step S437.

In step S437, the system control circuit 50 determines whether a different other operation has been executed by the user. In the present exemplary embodiment, the different other operation includes an operation of the operation member of the operation unit 70 other than the touch panel, and an operation on the touch panel at a position other than the position of the button icon 501 or the button icon 502 (for example, an operation of the button icon 503 or above described touch AF operation). If it is determined that the user has executed the different other operation (Yes in step S437), then the processing advances to step S438. In step S438, the system control circuit 50 executes processing according to the different other operation. Then, the processing advances to step S439. On the other hand, if it is determined that the user has not executed any different other operation (No in step S437), then the processing advances to step S439.

In step S439, the system control circuit 50 determines whether the user has executed an image shooting end operation. In the present exemplary embodiment, the "image shooting end operation" refers to an operation for switching to a mode other than the image shooting mode (i.e., to the image reproduction mode) by operating the mode shift switch 60, or an operation for turning off the power of the digital camera 100 by operating the power switch 72. If it is determined that the user has not executed the image shooting end operation (No in step S439), then the processing returns to step S402. On the other hand, if it is determined that the user has executed the image shooting end operation (Yes in step S439), then the processing in the image shooting mode ends.

FIG. 6 is a flow chart illustrating an example of processing executed when it is determined that the SW1 is ON during the processing in the image shooting mode, which is described above with reference to FIGS. 4A and 4B. Each processing according to the flow chart in FIG. 6 is implemented by the system control circuit 50 by loading a program from the non-volatile memory 56 on the system memory 52 and executing it.

Referring to FIG. 6, in step S601, the system control circuit 50 clears the display of the button icons 501 to 503, and the icons 504 to 507 on the screen illustrated in FIG. 5.

In step S602, the system control circuit 50 executes image shooting standby processing, such as AF processing or AE processing. If an in-focus state is achieved, the system control circuit 50 executes control for displaying an in-focus frame which is displayed superposedly on the through-the-lens image 500. In step S603, the system control circuit 50 determines whether the SW2 is ON. If it is determined that the SW2 is ON (Yes in step S603), then the processing advances to step S605. On the other hand, if it is determined that the SW2 is not ON (No in step S603), then the processing advances to step S604.

In step S604, the system control circuit 50 determines whether the SW1 is still ON. If it is determined that the SW1 is still ON (Yes in step S604), then the processing returns to step S603. On the other hand, if it is determined that the SW1 is not ON (No in step S604), then the processing advances to step S607. In step S607, the system control circuit 50 displays the image shooting standby screen. The processing in step S607 is similar to the processing in step S401 described above with reference to FIG. 4A. More specifically, in step S607, the system control circuit 50 executes control for displaying the button icons 501 to 503, and the icons 504 to 507 again which have been eliminated from the display in step S601.

On the other hand, if it is determined that the SW2 is ON (Yes in step S603), then the processing advances to step S605. In step S605, the system control circuit 50 executes image taking processing (an actual image shooting operation) including exposure and image processing. In step S606, the system control circuit 50 records the image taken by the actual image shooting operation on the recording medium 200 as a file. In step S607, the system control circuit 50 displays the image shooting standby screen. Then, the processing returns to step S402 in FIG. 4A.

Now, an example of a method will be described in detail below for determining whether the user has touched the touch panel at a different position with a different finger while continuously touching the button icon 501 which is executed in step S423 in FIG. 4B (the processing that implements the multi point touching determination unit) with reference to FIGS. 8A through 8C.

With respect to the type of a device of the touch panel, a capacitance type device capable of executing multi-point detection can simultaneously detect a touching position on the button icon 501 (a first touching position) and another touching position (a second touching position) by the touching operations in step S423 in FIG. 4B. Accordingly, in the above described capacitance device, when the touching position on the button icon 501 and the touch-down operation on a different position are simultaneously detected, the system control circuit 50 can determine that the user has touched the touch panel at the different other position with the different finger while continuously touching the button icon 501 without executing a special method.

On the other hand, with respect to the type of a device of the touch panel, a resistance film type device has been widely used which is capable of detecting only a single touching position and not capable of executing multi-point detection. If the resistance film type device described above is used, the system control circuit 50 determines whether the user has touched the touch panel at a different position outside the area of the button icon 501 with the different finger while touching the button icon 501 in the following manner.

First, an example of a method for detecting a touching position on the resistance film type touch panel will be described in detail below. In the resistance film type touch panel, when the user has touched the touch panel at a single position only as illustrated in FIGS. 8A and 8B, a resistance value on each of an X-axis and a Y-axis which are set on the display unit 28 is detected. The touching position is identified according to the detected resistance values.

Figure 8A:
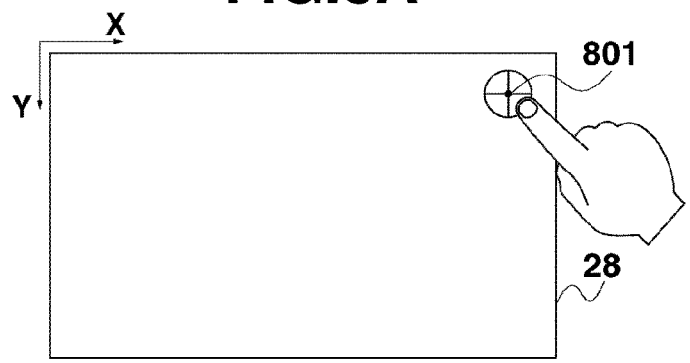
FIG. 8A illustrates an example of a method for detecting a single touch position at which the user touches a resistance film type touch panel.
Figure 8B:
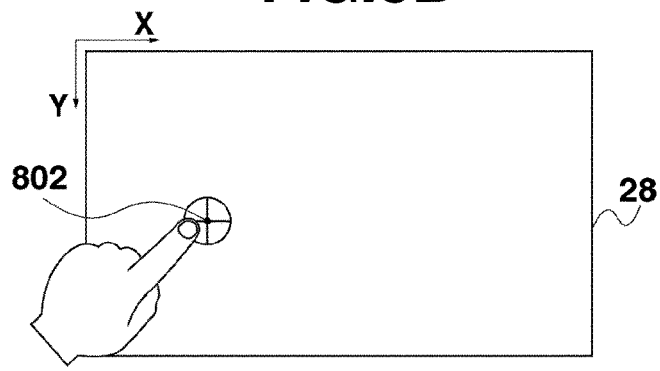
FIG. 8B illustrates an example of a method for detecting a single touch position at which the user touches a resistance film type touch panel.

In the example illustrated in FIG. 8A, the resistance value on each of the X-axis and the Y-axis is detected for a point 801 as the touching position. The system control circuit 50 acquires an X coordinate and a Y coordinate on the display unit 28 and identifies the touching position. Similarly, in the example illustrated in FIG. 8B, the system control circuit 50 acquires an X coordinate and a Y coordinate of a point 802 as the touching position on the display unit 28. The system control circuit 50 identifies the touching position according to the acquired X and Y coordinates of the touching position 802.

However, in the case of the resistance film type touch panel, if the user has simultaneously touched the touch panel at a plurality of points, the resistance film type touch panel detects the resistance value on both of the X- and Y-axes for a midpoint of the plurality of touching points only. For example, when the user has touched the touch panel simultaneously at points 804 and 805 on the display unit 28, the resistance film type touch panel detects the resistance values for a single point 806 only which is the midpoint between the points 804 and 805. Accordingly, in this case, touching operations simultaneously executed at a plurality of touching positions cannot be detected. However, by utilizing the characteristic such that the resistance values of the midpoint of two different simultaneously touched points are detected, if the user has touched the touch panel at a first point and the touching position thereof is acquired, the system control circuit 50 can determine whether the user has touched the touch panel at a second point while the touching of the first point is continued according to the acquired touching position.

Now, an example of a method of the determination processing executed in step S423 in FIG. 4B will be described in detail below. In the example illustrated in FIG. 8C, an area 803 indicates the area of the button icon 501. A center point 808 indicates the center point of the display unit 28. An upper-right area 807 indicates an area existing in an upper-right area of the display unit 28 from the center point 808 (an area including points whose X coordinate exists in the right-hand area of the center point 808 and whose Y coordinate exists in the upper-hand area of the center point 808). In this state, in most cases, the midpoint of a point existing within the area 803 and a different other arbitrary point existing in another area is generally included in the upper-right area 807. On the other hand, a point that does not exist within the upper-right area 807 can be considered not to be the midpoint of a single point included in the area 803 and another arbitrary point included in another area.

Accordingly, in step S423 of the present invention, if a touching position existing within the upper-right area 807 is detected after a state in which a single point included in the area 803 was detected as the touching position without detecting the touch-up operation, then the system control circuit 50 determines that the user has touched the touch panel with the finger other than the finger touching the button icon 501 simultaneously as touching the button icon 501.

Figure 8C:
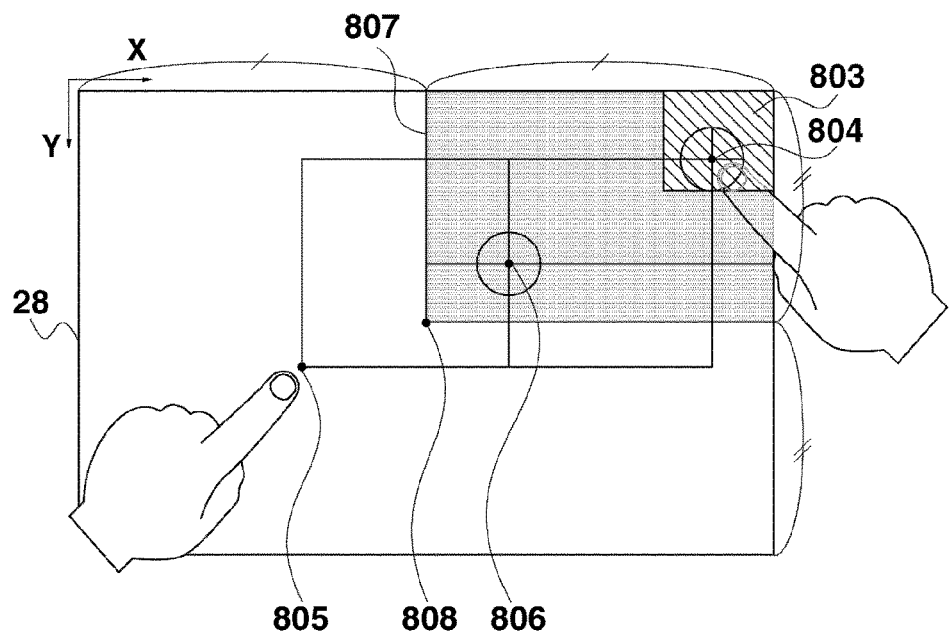
FIG. 8C illustrates an example of a method for detecting a plurality of touch positions at which the user touches a resistance film type touch panel.

For example, when a touching operation at the point 806 has been detected after a touching operation at the point 804 is detected without detecting the touch-up operation in the example illustrated in FIG. 8C, it can be estimated that the user has touched the point 805, which is a point of point symmetry with the point 804 around the point 806, simultaneously as touching the point 804. Accordingly, the system control circuit 50 displays the warning message 2 which indicates that the user cannot execute the touch AF function assigned at the position of the point 805. By executing the method described above, the present exemplary embodiment can detect simultaneously executed touching operations at a plurality of positions if the resistance film type touch panel is used.

As described above, if the user has touched the touch panel in a specific area thereof (i.e., on the button icon 501) continuously for a predetermined time period or longer, the exemplary embodiment of the present invention disables the function assigned to the touched area and does not execute the function corresponding to the touched area even if the user executes the touch-up operation after that. In this case, the system control circuit 50 disables the function of the touched area only temporarily. As described above with reference to the flow chart in FIGS. 4A and 4B, the user can execute the function of the touched area by performing the touch-up operation by touching the touch panel again within a predetermined time period after the touch-up operation. With the above described configuration, the present exemplary embodiment can prevent execution of a function if the user unintentionally touches the touch panel. Accordingly, the present exemplary embodiment can suppress an operation error.

Further, the present exemplary embodiment disables the function only temporarily before the user executes the touch-up operation. Accordingly, it is only necessary for the user to tap the button icon 501 again if the user desires to execute the function assigned to the button icon 501. Therefore, it is not necessary for the user to execute a particular operation for releasing the function disabled state. Accordingly, the present exemplary embodiment can prevent an operation error without degrading the operability.

Further, according to the exemplary embodiment of the present invention, a button icon that is capable of reducing an operation error, such as the button icon 501 described above, can be provided on the touch panel at a position that the user may easily and unintentionally touch. Accordingly, the present exemplary embodiment can reduce restriction of a layout of touching operation members of the touch panel.

In the example illustrated in FIGS. 4A and 4B, the system control circuit 50 temporarily disables the button icon (the specific area) 501 only, among the plurality of button icons, if the user touches the same for the predetermined time period or longer. Button icons other than the button icon 501, such as the button icon 502 (the other area), are enabled regardless of the time period of continuous touch-on state. The button icon 501 is provided at a position the closest to a vertex (an upper-right vertex of the display unit 28) nearest to the shutter button 61 among button icons displayed on the display unit 28. In most cases, the user may hold the digital camera 100, which includes a shutter button, in the manner described above with reference to FIG. 3. Therefore, the user may unintentionally touch the touch panel at a vertex of the display unit 28 near the shutter button 61. On the contrary, the user may not often touch the touch panel at a position distant from the vertex near the shutter button 61. Therefore, if a touching operation at a position on the touch panel distant from the shutter button 61 has been detected, it is likely that the user has touched the touch panel at the position intentionally. Therefore, it is useful if the system control circuit 50 disables only a button icon provided at a position that is the nearest from a vertex of the display unit 28 from the shutter button 61 among a plurality of button icons if a continuous touching operation for a predetermined time period or longer has been executed. Accordingly, the present exemplary embodiment can appropriately distinguish between unintentional touching by the user and an intentional touching operation by the user.

In the example illustrated in FIGS. 4A and 4B, the system control circuit 50 disables the button icon 501 only if the user has touched the button icon for a predetermined time period or longer. However, the present invention is not limited to this. The number of button icons disabled by the continuous touching for the predetermined time period or longer is not limited to one.

In other words, the system control circuit 50 may disable some of or all of a plurality of button icons if continuous touching by the user for the predetermined time period or longer is detected. For example, as illustrated in FIG. 3, the user may touch the touch panel at a position of the display unit 28 whose Y coordinate is close to the shutter button 61 with the cushion portion of the right-hand thumb in the lower portion of the display unit 28. Accordingly, the system control circuit 50 may disable a plurality of button icons whose Y coordinate is close to the shutter button 61 if the button icon is continuously touched by the user for the predetermined time period or longer. Further, the system control circuit 50 may disable the plurality of button icons at different time periods of continuous touching according to the positions at which the button icons are provided. In this case, considering the difference of probability of unintentional touching according to the position of the button icons, it is useful to shorten the time period of continuous touching (threshold value), according to which the function corresponding to the button icon is disabled as the distance of the position from the shutter button 61 becomes less.

For example, it is assumed that the system control circuit 50 temporarily disables the button icon 502 when continuous touching by the user for the predetermined time period or longer is detected.

In this case, if it is determined that the user has touched the touch panel on the button icon 502 (a second area) (Yes in step S403 in FIG. 4A), then the system control circuit 50 starts the timer and counts the length of the time period in which the button icon 502 is in the touch-on state. This method implements a second time counting unit according to the present exemplary embodiment. Then, the system control circuit 50 determines whether the length of the time period in which the button icon 502 is in the touch-on state has reached or become longer than a second time period which is longer than the length of time period of continuous touching (the predetermined time period used in step S411) that is the criterion of disabling the execution of the function of the button icon 501 (the specific area).

If it is determined that the touch-up operation from the position of the button icon 502 is detected in step S406 and the length of the time period of continuous touching at the position of the button icon 502 which is counted by using the timer has not reached the second time period, then the system control circuit 50 executes the function assigned to the button icon 502. On the other hand, if it is determined that the touch-up operation from the position of the button icon 502 is detected in step S406 and the length of the time period of continuous touching at the position of the button icon 502 which is counted by using the timer has reached the second time period, then the system control circuit 50 does not execute the function assigned to the button icon 502.

In the present exemplary embodiment, the second time period is set longer than the predetermined time period used in step S411 (FIG. 4A) because the button icon 502 (the second area) is more distant from the vertex of the display unit 28 that is the closest to the shutter button 61 (i.e., the upper-right vertex of the display unit 28) than the button icon 501 (the specific area). As described above, in the present exemplary embodiment, if the distance of a touching position from the shutter button 61 is short, it is determined that the possibility of occurrence of erroneous touching on the touch panel becomes higher. Therefore, it is useful to shorten the time period of continuous touching, according to which the function corresponding to the button icon is disabled, as the distance of the position from the shutter button 61 becomes less. Accordingly, the system control circuit 50 does not execute the function of the corresponding button icon unless the user executes a specific intentional operation, and the present exemplary embodiment can prevent an operation error.

As a possibility of the operation error, if a user carries the digital camera 100 in a bag or puts the digital camera 100 with the display unit 28 facing down, in which the touch panel is provided, an object may touch the touch panel against the intention of the user. The present invention is useful in preventing the operation error that may otherwise occur due to the above described touching on the touch panel. Once the above described unintentional touching on the touch panel occurs, it is likely that the touching continues for a relatively long time period. In this case, according to the present invention that temporarily disables touching that continues for a predetermined time period or longer, the operation error that may otherwise occur due to unintentional touching can be prevented. In this case, since the position of the button icon on the surface of the display unit 28 does not relate to the probability of occurrence of the operation error, the system control circuit 50 may temporarily disable the functions of all the button icons when touching continues for the predetermined time period or longer.

The processing executed in the image shooting mode is described above with reference to FIGS. 4A and 4B. On the other hand, in the image reproduction mode, different from the image shooting mode, a button icon provided at the same position as the position of the button icon 501 or a button icon provided in a state at least a part thereof is overlapped with the area of the button icon 501 may be enabled regardless of the length of the time period of the touching. This is because in the image reproduction processing, different from the case of the image shooting mode, it is likely that the user does not hold the digital camera 100 in the manner in which the finger of the user touches the shutter button 61 as illustrated in FIG. 3. Therefore, a button icon whose corresponding function is to be disabled by continuous touching for a predetermined time period or longer is not provided for the image reproduction mode. Alternatively, considering the way of holding of the digital camera 100 by the user during the image reproduction mode, a button icon whose corresponding function is to be disabled by continuous touching for the predetermined time period or longer may be provided at a position different from the position of the button icons for the image shooting mode.

It is also useful if the digital camera 100 includes an attitude detection sensor. An attitude detection sensor refers to a sensor capable of detecting an attitude of the digital camera 100 in relation to the direction of gravity. The attitude detection sensor includes a sensor, such as an acceleration sensor or a vertical-horizontal device position sensor.

When the attitude detection sensor detects that the front face of the digital camera 100 is horizontally oriented (a first attitude), it is likely that the digital camera 100 is held by the user in the manner described above with reference to FIG. 3. On the other hand, when the attitude detection sensor detects that the front face of the digital camera 100 is vertically oriented (a second attitude), it is likely that the digital camera 100 is held in a manner different from the manner described above with reference to FIG. 3. In this case, it is likely that the user touches the touch panel at a position different from the position illustrated in FIG. 3. Accordingly, when the attitude detection sensor detects that the front face of the digital camera 100 is vertically oriented, it is useful that a button icon provided at a position different from the button icon which is provided when the attitude detection sensor detects that the front face of the digital camera 100 is horizontally oriented, may be temporarily disabled upon detection of continuous touching for a predetermined time period or longer.

More specifically, when the attitude detection sensor detects that the digital camera 100 is horizontally oriented, it is useful if the button icon 501 is set as the button icon to be disabled if continuous touching for the predetermined time period or longer is detected as described above with reference to FIGS. 4A and 4B. In addition, button icons other than the button icon 501 are kept enabled regardless of the length of the time period of the continued touch-on operation. On the other hand, when the attitude detection sensor detects that the digital camera 100 is vertically oriented, it is useful if a button icon other than the button icon 501 (i.e., the button icon 503, for example) is set as the button icon to be temporarily disabled if continuous touching thereon for the predetermined time period or longer is detected. In addition, the button icons other than the button icon 503, including the button icon 501, are enabled regardless of the length of the time period of the continued touch-on operation. With the above described configuration, the present exemplary embodiment can securely prevent an operation error according to the attitude of the digital camera 100.

The type of the touch panel implemented by the present invention is not limited to a specific type. More specifically, any touch panel capable of detecting an operation of touching the display unit can be used as the touch panel according to an exemplary embodiment of the present invention. The type of the touch panel that can be employed in the present invention includes a surface acoustic wave type touch panel, an infrared-ray type touch panel, or an electromagnetic induction type touch panel in addition to the resistance film type touch panel and the capacitance type touch panel described above.

The above described exemplary embodiment is implemented by an image pickup apparatus. However, the present invention can be implemented by any apparatus or device other than the image pickup apparatus that controls a display device including a touch panel, such as a cellular phone, a personal digital assistant (PDA), a music player, an image viewer, a videogame machine, a printing apparatus, or a car navigation device. If the present invention is implemented by an apparatus or device other than the image pickup apparatus, it is useful, considering the way of holding the apparatus or device or the state of use thereof, if a button icon is disabled at a specific appropriate timing according to the position at which each of a plurality of button icons is provided.

If the present invention is implemented by an apparatus or device other than the image pickup apparatus which does not include a shutter button, the user may unintentionally touch the touch panel with the hand that holds the apparatus or device at a position close to a gripping (holding) portion of the apparatus or device. Accordingly, it is useful if only a button icon provided on the display unit at a position close to the gripping portion is disabled when continuous touching for the predetermined time period or longer is detected. Alternatively, it is also useful if some button icons provided on the display unit at a position close to the gripping portion are disabled if continuous touching for the predetermined time period or longer is detected. If different length of time period of continuous touching is set for each button icon, the length of time period of continuous touching for disabling the function thereof may be set short for a button icon provided at a position close to the gripping portion.

The exemplary embodiments of the present invention are described above. However, the present invention is not limited to the above described exemplary embodiments of the present invention. More specifically, various other embodiments can be included in the scope of the present invention and implement the present invention. Furthermore, a combination of a plurality of the above described exemplary embodiments of the present invention can implement the present invention.

The above described control of the entire digital camera 100 can be implemented by single hardware or can be shared by a plurality of hardware devices.

The present invention can also be achieved by providing a system or an apparatus with a storage medium storing program code of software implementing the functions of the exemplary embodiments and by reading and executing the program code stored in the storage medium with a computer of the system or the apparatus (a central processing unit (CPU) or a micro processing unit (MPU)). In this case, the program code itself, which is read from the storage medium, implements the functions of the embodiments described above, and accordingly, the storage medium storing the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An information processing apparatus comprising a memory and at least one processor, the at least one processor operating as:
  a touching detection unit configured to detect at least one touching operation for touching a display unit, and a respective or corresponding touch-up operation for discontinuing the at least one touching operation on the display unit;
  a display control unit configured to control the display unit to display a first display object in a first area of the display unit and to display a second display object in a second area of the display unit which is different from the first area;
  a time counting unit configured to count a time period of the at least one touching operation on at least one of the first display object and the second display object of the display unit, the at least one touching operation being continuous from a beginning to an end of the at least one touching operation; and
  a system control unit configured:
  (a) to execute a first function, which changes a mode or a setting of the information processing apparatus, assigned to the first display object based on the touching detection unit detecting the respective or corresponding touch-up operation from the first display object on which a first touching operation of the at least one touching operation has been detected before the time period of the first touching operation on the first display object counted by the time counting unit has reached a time period threshold;
  (b) to display an item regarding the first display object in response to the time period of the first touching operation on the first display object counted by the time counting unit having reached the time period threshold after the first touching operation on the first display object has been detected by the touching detection unit;
  (c) to execute a second function, which changes a mode or a setting of the information processing apparatus, assigned to the second display object, based on the touching detection unit detecting the respective or corresponding touch-up operation from the second display object on which a second touching operation of the at least one touching operation has been detected regardless of whether the time period of the second touching operation on the second display object is longer than the time period threshold or not; and
  (d) not to execute the first function assigned to the first display object based on the touching detection unit detecting the respective or corresponding touch-up operation from the first display object on which the first touching operation has been detected after the time period of the first touching operation on the first display object has reached the time period threshold.

2. The information processing apparatus according to claim 1, wherein the item is a warning message corresponding to the first display object.

3. The information processing apparatus according to claim 1, wherein the item is an icon corresponding to the first display object.

4. The information processing apparatus according to claim 1, wherein the system control unit is configured to execute the second function assigned to the second display object, based on the touching detection unit detecting the touch-up operation from the second display object on which the touching operation has been detected, and in response to the time period of the touching operation on the second display object being shorter than the time period threshold.

5. The information processing apparatus according to claim 1, wherein the at least one processor further functions as a second time counting unit configured to count a second time period of the touching operation on the second display object, and
  wherein the system control unit is configured to perform a control: (i), based on the touching detection unit detecting the touch-up operation from the second display object on which the touching operation has been detected and based on the second time period counted by the second time counting unit having not reached the time period threshold, to execute the second function assigned to the second display object, or (ii) based on the touching detection unit detecting the touch-up operation from the second display object on which the touching operation has been detected and based on the second time period counted by the second time counting unit having reached the second time period, not to execute second function assigned to the second display object based on a detection of the touch-up operation.

6. The information processing apparatus according to claim 1, wherein the system control unit is configured to perform a control: (i) in response to the information processing apparatus being in a specific mode, based on the touching detection unit detecting the touch-up operation from the first display object on which the touching operation has been detected, and based on the time period counted by the time counting unit having reached the time period threshold, not to execute the first function assigned to the first display object based on detection of the touch-up operation, or (ii) in response to the information processing apparatus being in a mode other than the specific mode and based on the touching detection unit detecting the touch-up operation from the first display object on which the touching operation has been detected, to execute the first function assigned to the first display object regardless of the time period of the touching operation on the first display object.

7. The information processing apparatus according to claim 6, further comprising:
   an imaging unit; and
   a mode shifting unit configured to shift an operation mode of the information processing apparatus to one mode among a plurality of modes at least including an image shooting mode and an image reproduction mode,
   wherein the specific mode is the image shooting mode.

8. The information processing apparatus according to claim 1, further comprising:
   an imaging unit; and
   a shutter operation member configured to receive a user instruction for taking an image given by the imaging unit,
   wherein the first display object is a button icon displayed on the display unit at a position that is the closest to a vertex of the display unit that is the closest from the shutter operation member.

9. The information processing apparatus according to claim 1, further comprising:
   an imaging unit; and
   a shutter operation member configured to receive a user instruction for taking an image given by the imaging unit,
   wherein the first display object is a button icon displayed on the display unit at a position that is closer to a vertex of the display unit that is the closest from the shutter operation member than a position of the second display object.

10. The information processing apparatus according to claim 1, wherein the item is a first warning message indicating that the first display object has been touched on the display unit.

11. The information processing apparatus according to claim 10, wherein the at least one processor further operates as a multi-point touching determination unit configured to determine whether a third display object different from the first display object has been touched simultaneously with the touching operation on the first display object, and
   wherein the display control unit is configured, in response to the multi-point touching determination unit determining that the third display object has been touched simultaneously with the touching operation on the first display object, to display a second warning message indicating that an action instructed by the touching operation cannot be executed on the display unit.

12. The information processing apparatus according to claim 11,
   wherein the multi-point touching determination unit is configured, in response to the touching operation on the display unit within a range in the display unit having been detected without detecting the touch-up operation after the touching operation on the first display object has been detected, to determine that a position included in the third display object has been touched simultaneously with the touching operation on the first display object.

13. The information processing apparatus according to claim 12,
   wherein the second warning message indicates that a function assigned to a first position based on the touching operation occurring within the first area around a second position included in the range cannot be executed.

14. The information processing apparatus according to claim 1, further comprising an attitude detection unit configured to detect an attitude of the information processing apparatus, wherein a position on the display unit is set as the first display object according to the attitude detected by the attitude detection unit.

15. The information processing apparatus according to claim 1, wherein the first display object is a button icon displayed at a position on the display unit that is closest from a position of a gripping portion for holding the information processing apparatus.

16. The information processing apparatus according to claim 1, wherein the first area is an upper right area of the display unit.

* * * * *